(12) United States Patent
Pattisapu

(10) Patent No.: US 7,009,531 B2
(45) Date of Patent: Mar. 7, 2006

(54) SYSTEM FOR AURALLY MONITORING AERONAUTICAL INFORMATION WHILE IN FLIGHT

(76) Inventor: Ram Pattisapu, 7633 Cedar Elm Dr., Irving, TX (US) 75063

( * ) Notice: Subject to any disclaimer, the term of this patent is extended or adjusted under 35 U.S.C. 154(b) by 144 days.

(21) Appl. No.: 10/195,286

(22) Filed: Jul. 15, 2002

(65) Prior Publication Data

US 2003/0016144 A1    Jan. 23, 2003

Related U.S. Application Data

(60) Provisional application No. 60/307,324, filed on Jul. 23, 2001.

(51) Int. Cl.
*G08B 23/00* (2006.01)

(52) U.S. Cl. .................. 340/963; 340/945; 340/961; 340/964; 340/968; 340/970; 701/8; 701/9; 701/301

(58) Field of Classification Search ............... 340/963, 340/966, 970, 980, 945, 968, 961, 964; 701/9, 701/14, 4, 8, 301, 300
See application file for complete search history.

(56) References Cited

U.S. PATENT DOCUMENTS

| | | | | |
|---|---|---|---|---|
| 3,581,014 A | * | 5/1971 | Vogel et al. | 369/21 |
| 3,924,262 A | * | 12/1975 | Melancon | 340/964 |
| 4,293,840 A | * | 10/1981 | Hadari | 340/27 |
| 5,119,091 A | * | 6/1992 | Zweifel | 340/968 |
| 5,936,552 A | * | 8/1999 | Wichgers et al. | 340/963 |
| 6,038,498 A | * | 3/2000 | Briffe et al. | 701/13 |
| 6,043,757 A | * | 3/2000 | Patrick | 340/963 |
| 6,043,759 A | * | 3/2000 | Paterson et al. | 340/970 |

* cited by examiner

*Primary Examiner*—Hung Nguyen
(74) *Attorney, Agent, or Firm*—F. Lindsey Scott

(57) ABSTRACT

A system and a method for providing a continuous, semi-continuous and/or repetitive aural signal to an aircraft pilot indicative of a difference between a set value and an actual value for one or more flight characteristics of the aircraft.

15 Claims, 1 Drawing Sheet

SYSTEM FOR AURALLY MONITORING AERONAUTICAL INFORMATION WHILE IN FLIGHT

RELATED APPLICATIONS

This application is entitled to and hereby claims the benefit of the filing date of the provisional application 60/307,324 entitled "System For Aurally Monitoring Aeronautical Information While In Flight" filed Jul. 23, 2001 by Ram Pattisapu.

FIELD OF THE INVENTION

This invention relates to a method and apparatus for providing an audible signal to a pilot indicative of at least one flight characteristic of an aircraft.

BACKGROUND OF THE INVENTION

It is well known that when piloting an aircraft (airplane, helicopter and the like) in instrument meteorological conditions (IMC), or visual meteorological conditions (VMC), and the like, a systematic and thorough scanning and visual monitoring of the aircraft instruments is of utmost importance. In IMC, reliance upon and monitoring of the instrument panel is essential. In addition the pilot must remain aware of other conditions in the aircraft and maintain an ongoing search for air traffic and other potential hazards.

Presently, many instruments are available in an aircraft to provide information to the pilot as to the condition and flight characteristics of the aircraft at any given time. Such instruments provide information related to conditions such as altitude, headings, air speed, glide path, interception of radials, attitude of the aircraft and the like. All of these instruments must be monitored continuously to maintain an awareness of the condition of the aircraft to avoid potentially hazardous situations. At present, such monitoring is primarily done visually. Many of these instruments are so important that they are equipped with alarms, which may generate highly noticeable signals when extreme variations from a desired condition occur. These alarms may take the form of a loud noise, a flashing light, a combination thereof, or the like. Such signals may be used for failures to lower landing gear when the aircraft approaches a low altitude, for an air speed below a selected minimum, or the like. Such signals have typically been buzzers, beepers, horns, or other similar sounds. Such signals are not typically used until extreme conditions are noted. This presents a hazard since the occurrence of these extreme variations from desired conditions can result in difficulty in correcting the flight characteristic which has approached an extreme condition. Further, the signal of the extreme condition is generally set to indicate only a hazardous condition. Accordingly, there is no monitoring alarm or indication to warn the pilot of lesser variations from a selected condition prior to the occurrence of any extreme condition.

It would be highly desirable if a system could be provided which provided a continuous or substantially continuous audible notice to the pilot of small differences from a set value for selected flight characteristics so that such differences can be easily corrected before reaching a severe or hazardous difference from the set value.

In medical areas of endeavor, such as surgery, continuous aural monitoring of various medical patient symptoms has been used. These systems comprise the use of audio monitoring with various sounds and pitches, such as a pulsating sound at various pitches to reflect changes in a first condition with the pulse being modulated to reflect changes from a second desired condition. Since these monitoring systems have been used, the technology for the implementation of such systems is well known.

Similar problems occur in aircraft. In other words, the pilot must remain aware of a large number of variables during flight and it would be highly desirable if a system could be provided which would allow the pilot to remain continuously aware of selected key flight characteristics while engaged in otherwise monitoring the flight characteristics of the aircraft and other conditions related to the safe operation of the aircraft. Accordingly, a continuing effort has been directed to the development of improved methods for maintaining pilot awareness of critical conditions that may occur in an aircraft, either commercial or private.

SUMMARY OF THE INVENTION

According to the present invention, it has now been found that a pilot can be continuously advised of certain flight characteristics by a method for providing an audible signal to a pilot indicative of at least one flight characteristic of an aircraft, the method comprising: monitoring at least one flight characteristic of the aircraft; setting a selected value for the at least one flight characteristic; and, generating a repetitive audible signal when deviations from the selected value occur, the audible signals being indicative of the deviation and extent of the deviation and audible to the pilot.

It is further been found that a pilot can be kept aware of selected flight characteristics by a system for providing an audible signal to the pilot during a selected time indicative of at least one flight characteristic of an aircraft, the system comprising: at least one instrument adapted to monitor at lest one flight characteristic of the aircraft; a comparator adapted to receive a signal indicative of the at least one flight characteristic and compare the signal to a selected value for the flight characteristic and generate a signal indicative of any difference in the selected value and a current value from the instrument adapted to monitor the at least one flight characteristics; and, an audible signal generator adapted to receive the signal indicative of any difference and generate an audible signal to the pilot indicative of the difference.

DESCRIPTION OF THE PREFERRED EMBODIMENTS

In the description of the Figures, the same numbers will be used throughout to refer to the same or similar components.

The present invention comprises a system and a method for providing a substantially real-time continuous, semi-continuous or repetitive audible sound indicative of at least one flight characteristic to a pilot of an aircraft during a selected time during operation of the aircraft.

Figure 1:
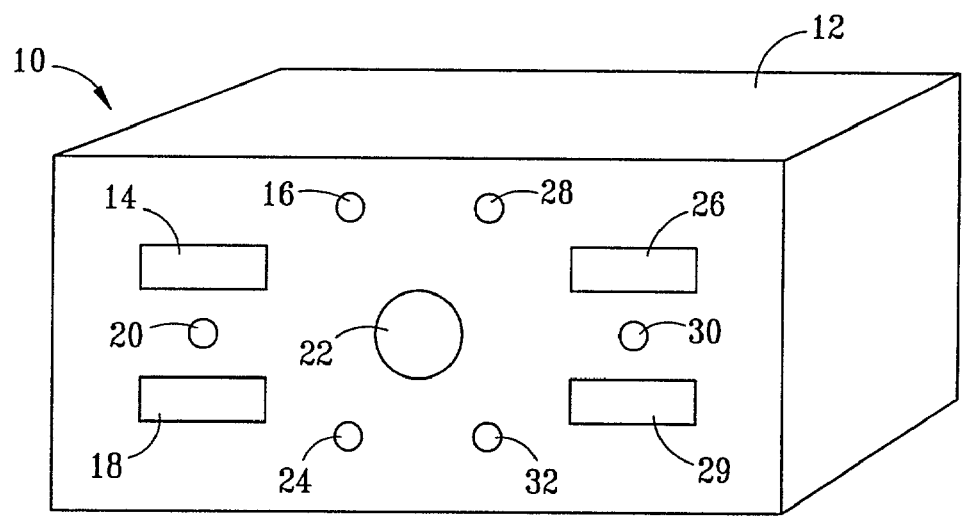
FIG. 1 is a schematic diagram of an embodiment of the system of the present invention.

This indication may be provided in a variety of ways. In FIG. 1, an embodiment of the present invention is shown. A system 10 for providing a repetitive, substantially continuous or continuous audible signal to a pilot during a selected time indicative of at least one flight characteristic of an aircraft is shown. The system comprises: at least one instrument adapted to monitor at least one flight characteristic of an aircraft; a comparator adapted to receive a signal indicative of the at least one flight characteristic and compare the signal to a selected value for the flight characteristic and generate a signal indicative of any difference in the selected value and a current value from the instrument adapted to monitor for the at least one flight characteristic; and, an audible signal generator adapted to receive the signal indicative of any difference and generate an audible signal to the pilot indicative of the difference. The system, as shown, comprises a casing 12, which includes a heading instrument readout 14. The heading instrument may include a set/reset control 16. Such instruments are well known to those skilled in the art. It is also well known that the instrument readings may be presented on round, square, numerical or other shape readouts.

A selected heading is set on instrument readout 18, which is controllable by a selector control 20. This enables the pilot to set a desired heading on instrument 18. A sound is produced, which is indicative of any difference between the present actual heading shown on instrument 14 and the desired heading shown on instrument 18. The sound may be a pulsating sound indicative of the difference, which may change to a continuous monotonic sound when the headings are the same, with the sound becoming pulsating at an increasing frequency that may or may not be proportional to the difference when the two headings are different. Different sound patterns may be used if desired for differences in heading to either the right or the left of a desired heading. For instance, different pulsating or other sound patterns could be used or the like. Further, different tones could be used if desired.

While it is not used in all embodiments to provide an audible indication to the pilot, a speaker 22 is shown. Typically, and preferably, the signal to the pilot will be delivered through a headset where the volume of the signal to the pilot can be at a level such that it does not interfere with the pilot's receipt of audible messages from a radio or from his ability to speak into and communicate via a radio. Alternatively, the speaker could be used to provide an audible signal in the cabin. It is preferred that a headset be used since the cabin frequently may have noise from other sources and the like and the signal to the pilot may be disruptive to the pilot or copilot when trying to hear other signals.

The system may also include a mode selector 24 that will enable the selection of the mode of operation. For instance, the mode selector may be used by setting a desired vector from a source so that as the aircraft approaches the selected vector the difference is reduced. Similarly, an embodiment may be selected wherein an instrument landing system is used. This embodiment will be discussed in somewhat greater length hereinafter.

The system as shown in FIG. 1 also includes an altimeter 26. An instrument 29 allows the selection of a selected altitude by use of a selector 30. In a similar fashion, the difference between the selected altitude and the actual altitude can be conveyed to the pilot by an aural signal which may be an overlay of the signal for the heading or it may be represented by a change in the signal for the heading or the like. A wide variety of options are available for the sound pattern. A controller 32 allows the selection of a volume and type of sound pleasing to the pilot. The controller may be used with each of the characteristics or separate controllers (not shown) may be provided as desired.

A control 28 is shown for use with a VOR/ILS system. As well known to those skilled in the art, VOR systems operate by positioning a signal source at a desired location, which enables aircraft to monitor the radiated signal from the source and follow the signal to the source. ILS systems enable a pilot to use instruments to land an aircraft.

Figure 2:
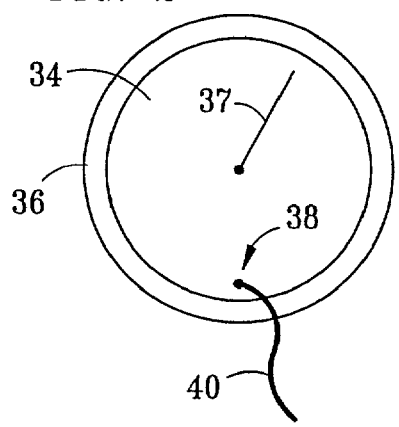
FIG. 2 shows an instrument that is adapted for monitoring to provide an input into the system of the present invention.

In FIG. 2, an instrument 34, which may be an altimeter or a heading indicator or the like, is shown. In this instance, a cup 36 is applied over the instrument face so that the face of the instrument is not obstructed to the visual observation of the pilot. The cup includes a crystal chip 38, or the like, as well known to those skilled in the art, which is positioned to monitor the position of a needle 37 indicating the parameter displayed on the instrument. This signal may be then transmitted via a wire 40 or wirelessly to the system of the present invention.

Figure 3:
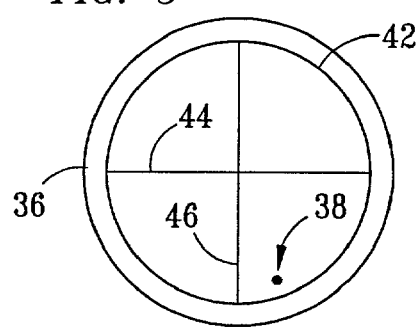
FIG. 3 shows a second instrument monitored for use according to the present invention; and, FIG. 4 shows a further illustrative aircraft instrument.

In FIG. 3, an instrument landing display 42 is shown. In the instrument landing display, it is desirable that the pilot maintain the center of the aircraft 48 in a position such that the aircraft heading is shown centered on a line 46 with the altitude of the aircraft being maintained such that the aircraft is shown on a line 44 as the aircraft approaches for a landing. Suction cup 36 is shown over the instrument face and crystal chip 38 is positioned as shown for monitoring the position of the aircraft as shown on the instrument face.

Figure 4:
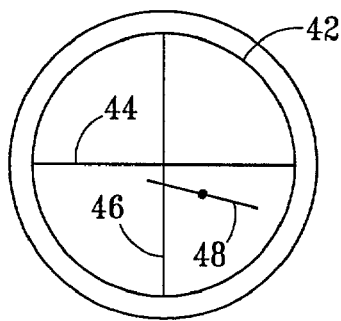

In FIG. 4, a similar system is shown but with no crystal chip. The aircraft 48 is shown to be out of position.

The required signal may be generated by the crystal chip and transmitted wirelessly or via a wire connection to the system of the present invention or the signals may be obtained from the digital inputs to the instrument displays in an aircraft, particularly when commercial aircraft are involved. Further, the system of the present invention may include its own instruments for sensing the desired properties. For instance, a small global positioning satellite transceiver could be positioned in the system as well as a plurality of sensors for determining the altitude, air speed of the aircraft, and the like. Such instruments are well known to those skilled in the art and need not be discussed in detail.

Further, while the system is shown housed in a casing 12, the system may well be housed in the instrument panel of the aircraft with either a wireless or a wired connection to a set of headphones for the pilot. Of course, alternatively, a sound could be emitted via a speaker or the like into the cockpit.

The system may rely completely upon inputs from the aircraft instrument system. The use of such signals must be subordinated to the requirements for reliable input to the instruments required for the pilot's observation as required under normal operating conditions and applicable regulations. Alternatively, the system may operate wholly or completely on signals received from instruments provided within the system. Especially with smaller aircraft such may be the case. In either event, existing instruments may be monitored for the determination of a difference between an actual reading and a set reading. the difference is used to generate a signal to the pilot, which is indicative to the pilot of a difference from the set operating condition.

To avoid continual signals indicating a difference, the pilot is also desirably able to set a desired tolerance below which no difference is indicated. For instance, it may be tolerable to allow the altitude to vary by plus/minus 50 feet without a signal to the pilot that the altitude differs from the set altitude. Similarly, differences in air speed, heading the like may also be permissible within selected limits. The system is desirably equipped with controls (not shown) for entering the permissible tolerance from the selected setting before a signal indicating a difference is generated.

The signal generated may be absent or may be a monotonic or pleasing pulsating or other sound when the difference is within the selected limits. The sound may be a pulse, a split pulse, or the like that increases in frequency as the heading varies in one direction and decreases in frequency as the heading varies in another direction. Similarly, the pulsing sound may rise in tone as the altitude increases beyond a selected level and decreases in tone as the altitude decreases. The increase or decrease may or may not be proportional to the actual difference. A desired objective is to advise the pilot early of differences in selected conditions so that the differences may be corrected before they reach hazardous limits. Sound generating equipment based upon such signals is well known as discussed previously.

The changes in sound may be changes in the sound, pitch, pulse, frequency, volume or any one of numerous other parameters to indicate changes in the selected characteristic. As indicated previously, the system may be a totally portable device, which may be capable of functioning as a stand-alone system or it may be a panel mounted unit or any combination thereof. Desirably the system would include a bank of selectable tones that are pleasing and non-disruptive to the pilot. The pilot may select one type of tone for an en route flight and another for an approach, i.e., ILS approaches or otherwise. The actual signal should have difference aspects, which can be modified to serve as an alert. For instance, a modulation of the frequency, volume, pulse, split sounds, continuous sounds with blips, waves and the like are all to be considered usable within the scope of the present invention.

Further, the system is desirably buffered to prevent occasional bumps or blips in the output from any instrument from causing discordance in the sounds that might occur with an aberrant needle deflection or blip. This will prevent wild swings in sounds from abrupt control changes or turbulence, and will permit the sound to the pilot to be relatively constant and indicative of actual flight characteristics. The system is designed to take into consideration on-going radio communications so that the tone is desirably played in the background in such a way that, while it may penetrate the radio conversation, it does so without interference or problems with the actual conversation with the transmitting or receiving parties, with marker beacon signals and the like. The programming of the various modulations may be done inside the box with predictable logic so that after a few flights and maneuvers the pilot develops an intuitive sense of what the signals are telling him. The system should be simultaneously user-friendly and adaptable. The sensitivity for changes or differences depicted by the aural signals may be changed for cruise flight, approach flight, instrument landing flying and the like. For instance, in en route (cruise) flight, after the aircraft has been trimmed for the desired heading and altitude, the pilot may then press the set/reset button to set the desired levels. When the aircraft moves to a selected limit above or below the set altitude the pitch of the monitoring tone would change. For instance, the pitch could increase when the aircraft climbs above the set level and decrease when the aircraft falls below the set level. Frequency changes could indicate differences in heading and the like. The selection of the desired tolerances and the like are well within the skill of those in the art.

As indicated previously, the system may be used to target a particular altitude or course. The selection of these parameters is set and as the desired course or altitude is intercepted, the tone could change from a pulse to a different pulse or to perhaps a single tone. The pitch of the sound could also change until the set altitude is reached and so on.

In instrument landing, the system can be used to advise the pilot of conditions such as shown in FIG. 4, where the pilot is off level and off course from the targeted landing area.

Additional parameters, which could be depicted, are differences in air speed, VSI (vertical speed indicator), engine instruments, gear/flap markers, (reminding messages for these), elapsed time and the like. The system can be designed to be as complex as desired to provide the pilot with an audible signal of selected flight characteristics. For instance, the system could be programmed to sequentially provide signals indicative of a large variety of flight characteristics.

The system is used in a method for providing an audible signal to a pilot indicative of at least one flight characteristic of an aircraft. The method comprises: monitoring at least one flight characteristic of the aircraft; setting a selected value for the at least one flight characteristic; and, generating a repetitive audible signal when deviations from the selected value occur, the audible signals being indicative of the deviation and extent of the deviation and audible to the pilot.

The system and method for providing audible information to the pilot are considered to provide the pilot with advanced warning of differences in flight conditions at a time when they may be readily corrected before major differences between the desired condition and the present condition occur. Pilots are considered to be capable of readily adapting to the use of the audible signals in addition to the visual inputs normally used to enable safer operation of the aircraft. This enables the receipt by the pilot of an audible signal, even while he may be engaged in scanning the area for other aircraft or other hazards, looking at other instruments on the panel in the cabin of the aircraft and the like. It is believed that this offers an additional safety feature for use with aircraft, both commercial and private, which will enable safer operation of such aircraft.

The system may also include set points for warnings, such as low altitude without wheels and flaps down, airspeed below critical speed, and the like. Such warnings can be by continuous, semi-continuous or repetitive sounds, by voice warnings, and the like.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

I claim:

1. A method for providing an audible signal to a pilot indicative of at least one flight characteristic of an aircraft, the method comprising:
   a) monitoring at least one flight characteristic of the aircraft;
   b) setting a selected value for the at least one flight characteristic; and,
   c) generating a substantially continuous audible signal during a selected time, the audible signal being variable to a pulsating signal of variable frequency to indicate the occurrence and extent of a deviation from the selected values for a first flight characteristic and variable to different tonal pitches to indicate the occurrences and extent of a deviation from a second flight characteristic so that the pilot may correct such deviation before the deviation reaches a hazardous condition.

2. The method of claim 1 wherein a plurality of flight characteristics are monitored and wherein values are selected for a plurality of flight characteristics and wherein an audible signal is generated indicative of deviations and the extent of such deviations from selected values for at least two flight characteristics.

3. The method of claim 1 wherein the at least one flight characteristic is selected from altitude, heading, air speed, glide path and interception of radials.

4. The method of claim 1 wherein the audible signal varies in response to a deviation from the selected value to indicate the extent of the deviation.

5. The method of claim 1 wherein the audible signal is a pulsating signal.

6. The method of claim 5 wherein a frequency and tone of the audible signal are variable to indicate deviations from selected values for two selected flight characteristics.

7. The method of claim 1 wherein the audible signal is communicated to the pilot via a headset.

8. The method of claim 1 wherein the first flight characteristic is heading and wherein the second flight characteristic is altitude.

9. The method of claim 1 wherein the selected time is during an instrument landing system approach to a landing.

10. The method of claim 1 wherein the deviation from the selected value is a deviation less than a hazardous deviation from the selected value.

11. A system for providing an audible signal to a pilot during a selected time indicative of at least one flight characteristic of an aircraft, the system comprising:

a) at least two instruments, each of the instruments being adapted to monitor at least one of at least two flight characteristic of the aircraft at least two instruments being used to monitor the altitude and heading of the aircraft;

b) a comparator adapted to receive a signal indicative of the at least one flight characteristic and compare the signal to a selected value for the flight characteristic and generate a signal indicative of any difference in the selected value and a current value from the instrument adapted to monitor for the at least one flight characteristic; and, c) an audible signal generator adapted to receive the signal indicative of any difference and generate a pulsating audible signal at a variable frequency to the pilot indicative of the difference so that the pilot may correct such difference between a selected value and the current value for at least one flight characteristic before the difference reaches a hazardous condition.

12. The system of claim 11 wherein the flight characteristic is selected from altitude, heading, air speed, glide path and interception of radials.

13. The system of claim 11 wherein the system further includes means for communicating the audible signal to the pilot.

14. The system of claim 11 wherein means for communicating the audible signal to the pilot includes a headset adapted to receive an audible signal indicative of the difference or to generate from the signal indicative of the difference an audible signal indicative of the difference.

15. The system of claim 11 wherein the difference between the signal and the selected value is less than a hazardous difference.

* * * * *